United States Patent
Brown et al.

(10) Patent No.: US 12,113,670 B2
(45) Date of Patent: Oct. 8, 2024

(54) NETWORK MANAGEMENT

(71) Applicant: BRITISH TELECOMMUNICATIONS PUBLIC LIMITED COMPANY, London (GB)

(72) Inventors: Ruth Brown, London (GB); Jonathan Hart, London (GB); Maria Cuevas Ramirez, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 51 days.

(21) Appl. No.: 17/431,772

(22) PCT Filed: Jan. 30, 2020

(86) PCT No.: PCT/EP2020/052259
§ 371 (c)(1),
(2) Date: Aug. 18, 2021

(87) PCT Pub. No.: WO2020/169315
PCT Pub. Date: Aug. 27, 2020

(65) Prior Publication Data
US 2022/0150118 A1    May 12, 2022

(30) Foreign Application Priority Data
Feb. 22, 2019    (EP) .................... 19158918

(51) Int. Cl.
*H04L 41/0816* (2022.01)
*A63F 13/332* (2014.01)
(Continued)

(52) U.S. Cl.
CPC ........ *H04L 41/0816* (2013.01); *A63F 13/332* (2014.09); *A63F 13/358* (2014.09); *H04L 45/124* (2013.01); *H04L 47/808* (2013.01)

(58) Field of Classification Search
CPC . H04L 41/0816; H04L 45/124; H04L 47/808; H04L 45/125; H04L 47/76;
(Continued)

(56) References Cited

U.S. PATENT DOCUMENTS 5,820,463 A    10/1998  O'Callaghan
8,769,122 B2 *  7/2014  Hutcheson .......... G07F 17/3223
                                                              709/219
(Continued)

FOREIGN PATENT DOCUMENTS

| EP | 1 768 351 | 3/2007 |
| WO | 2018032920 | 2/2018 |
| WO | 2018/121880 | 7/2018 |

OTHER PUBLICATIONS

International Search Report and Written Opinion for PCT/EP2020/052259, mailed Feb. 17, 2020, 13 pages.
(Continued)

*Primary Examiner* — Kwang B Yao
*Assistant Examiner* — Syed M Bokhari
(74) *Attorney, Agent, or Firm* — Nixon & Vanderhye P.C.

(57) ABSTRACT

A method of managing a telecommunications network, the telecommunications network having a first user and a second user, the method comprising the step of: ascertaining a competitive characteristic associated with the first user and a competitive characteristic associated with the second user; comparing the ascertained competitive characteristics; identifying whether there is a disparity between the competitive characteristics that exceeds a threshold, thereby to identify a competitive advantage associated with the first or second user; and if it is identified that the disparity exceeds the threshold, adapting a network configuration of a network
(Continued)

connection associated with the first user so as to offset the competitive advantage associated with the first or second user.

32 Claims, 5 Drawing Sheets

(51) Int. Cl.
*A63F 13/358* (2014.01)
*H04L 45/12* (2022.01)
*H04L 47/80* (2022.01)

(58) Field of Classification Search
CPC ... H04L 67/131; H04L 45/123; H04F 13/332; H04F 13/358; G07F 17/3272; G07F 13/3276; H04W 40/12; H04W 40/125; H04W 40/34
USPC .................................................. 370/254, 465
See application file for complete search history.

(56) References Cited

U.S. PATENT DOCUMENTS

| | | | | |
|---|---|---|---|---|
| 10,096,204 | B1* | 10/2018 | Wakeford | G07F 17/3241 |
| 10,828,572 | B1* | 11/2020 | Kalama | A63G 31/16 |
| 2002/0107040 | A1 | 8/2002 | Crandall | |
| 2002/0142843 | A1 | 10/2002 | Roelofs | |
| 2004/0236856 | A1 | 11/2004 | Keohane | |
| 2005/0125150 | A1 | 6/2005 | Wang et al. | |
| 2006/0135258 | A1 | 6/2006 | Maheshwari et al. | |
| 2007/0070914 | A1* | 3/2007 | Abigail | H04L 45/121 |
| | | | | 370/465 |
| 2009/0088233 | A1* | 4/2009 | O'Rourke | A63F 13/30 |
| | | | | 463/7 |
| 2010/0304860 | A1 | 12/2010 | Gault et al. | |
| 2013/0079093 | A1 | 3/2013 | Lockton et al. | |
| 2014/0378231 | A1* | 12/2014 | Hutcheson | G07F 17/3211 |
| | | | | 463/42 |
| 2017/0086118 | A1* | 3/2017 | Vrzic | H04W 36/0011 |
| 2018/0152958 | A1 | 5/2018 | Arnold et al. | |
| 2018/0264360 | A1 | 9/2018 | Lockton et al. | |
| 2018/0287891 | A1 | 10/2018 | Shaw et al. | |
| 2018/0290060 | A1* | 10/2018 | Noss | A63F 13/47 |
| 2018/0359337 | A1 | 12/2018 | Kodaypak | |
| 2019/0118084 | A1 | 4/2019 | Ng | |
| 2019/0118087 | A1 | 4/2019 | Lockton | |
| 2020/0106819 | A1* | 4/2020 | Morrison | H04L 65/70 |
| 2020/0368614 | A1 | 11/2020 | Vilola | |
| 2021/0203546 | A1 | 7/2021 | Bartlett | |

OTHER PUBLICATIONS

Extended European Search Report Received for Application No. 19158918.3, dated Jun. 28, 2019, 7 pages.
Examination Report for GB1900480.3 dated Feb. 25, 2021, 8 pages.
GB Combined Search and Exam Report for GB1900480.3 dated Jul. 11, 2019, 8 pages.
Ishibashi et al., "Fairness among game players in networked haptic environments: influence of network latency", IEEE International Conference on Multimedia and Expo, Jul. 6, 2005, pp. 57-60.
PCT International Search Report for PCT/EP2018/050236, mailed Jan. 24, 2020, 13 pages.
Zander et al, "Achieving Fairness in Multiplayer Network Games Through Automated Latency Balancing", Proceedings of the International Conference on Advances in Computer Entertainment Technology, ACE 2005, Jun. 2005, URL: http://citeseerx.ist.psu. edulviewdoc/download?doi=10.1.1.549.905&rep= rep 1 &type= pdf, 8 pages.
Akgül et al., "Service-aware Network Slice Trading in a Shared Multi-tenant Infrastructure", 2017 IEEE, 7 pages.
Office Action dated Apr. 29, 2022, issued for U.S. Appl. No. 17/422,367 (29 pages).
Office Action dated Aug. 12, 2022, issued for U.S. Appl. No. 17/422,367 (25 pages).
Office Action dated Dec. 27, 2022, issued for U.S. Appl. No. 17/422,367 (25 pages).
Translation of Chinese Office Action dated Feb. 7, 2024, issued for Chinese Application No. 202080015521.8 (8 pages).

* cited by examiner

NETWORK MANAGEMENT

This application is the U.S. national phase of International Application No. PCT/EP2020/052259 filed 30 Jan. 2020, which designated the U.S. and claims priority to EP patent application Ser. No. 19/158,918.3 filed 22 Feb. 2019, the entire contents of each of which are hereby incorporated by reference.

FIELD OF INVENTION

The present invention relates to a method of managing a telecommunications network, and in particular to a method of managing the telecommunications network so as to improve fairness amongst competing users; the present invention also relates to a telecommunications network therefor.

BACKGROUND

In competitive multi-user activities performed over a network, unfairness (including an imbalance in user enjoyment) may arise (all things otherwise being equal) where users of disparate skills and/or means (e.g. hardware) are pitted against one another. Yet, in a limited pool of users wishing to engage in such activities, there may be no choice but to pit users of significantly different skills and/or means against one another.

For example, where users of varying ability are competing in a peer-to-peer online multiplayer game, an imbalance in gameplay may arise where one team is composed of users having significantly greater skill than other users. This may diminish fairness and users' enjoyment of the experience, and may also potentially lead to abandonment of the game if enough users grow frustrated with the mismatch in skill and choose to leave the game. It is therefore an aim of the present invention at least to alleviate the aforementioned problems.

STATEMENTS OF INVENTION

According to a first aspect of the present invention, there is provided a method of managing a telecommunications network, the telecommunications network having a first user and a second user, the method comprising the step of: ascertaining a competitive characteristic associated with the first user and a competitive characteristic associated with the second user; comparing the ascertained competitive characteristics; identifying whether there is a disparity between the competitive characteristics that exceeds a threshold, thereby to identify a competitive advantage associated with the first or second user; and if it is identified that the disparity exceeds the threshold, adapting a network configuration of a network connection associated with the first user so as to offset the competitive advantage associated with the first or second user.

Preferably, the method further comprises the step of adapting a network configuration of a network connection associated with the second user so as to offset the competitive advantage associated with the first or second user. More preferably, the network configuration of the network connection associated with the second user is adapted in an opposite way to the way in which the network configuration of the network connection associated with the first user is adapted.

Preferably, as used herein, the term "competitive characteristic" connotes a measure of a user's skill in a competitive activity and/or means associated with the user that are used to engage in the competitive activity over a telecommunications network, wherein the competitive characteristics may influence the outcome of a competitive activity in favour of a given user (in the form of a competitive advantage or disadvantage). Optionally, the competitive characteristic is associated with a user and/or a UE that is used to engage in a competitive activity. Optionally, the network configuration is adapted only for the first user. Preferably, as used herein the term "user" connotes a human user themselves (and/or a user account or profile associated with said human user) and/or a UE used by (or associated with) said human user.

Preferably, adapting the network configuration comprises reducing network performance of the network connection associated with the first user. Optionally, adapting the network configuration comprises impeding processing of a network communication to and/or from the first user. Optionally, network performance comprises: latency; bandwidth (downlink and/or uplink); Round-Trip Time (RTT) delay; and/or error rate.

Preferably, adapting the network configuration comprises improving network performance of the network connection associated with the first user. Optionally, adapting the network configuration comprises prioritising processing of a network communication to and/or from the first user. Preferably, adapting the network configuration comprises changing a path through the telecommunications network of a network communication from and/or to the first user and/or the second user. Preferably, adapting the network configuration comprises changing a location within the telecommunications network of a network resource that is to be accessed by the first user and/or the second user.

Preferably, adapting the network configuration comprises corrupting a network communication from and/or to the first user and/or the second user. Preferably, adapting the network configuration comprises allocating the first user to a (optionally, new) network slice. Optionally, the first user is allocated to a network slice, and wherein adapting the network configuration comprises reconfiguring processing resources available to the network slice. Preferably, the method further comprises the step of determining an extent of the disparity, and adapting the network configuration in dependence upon the determined extent of disparity. Preferably, the method further comprises the step of limiting the extent to which the network configuration is adapted. Optionally, the method further comprises the step of limiting the frequency with which the network configuration is adapted.

Preferably, at least one of the competitive characteristics is indicative of a level of skill, and more preferably at a given competitive activity. Optionally, the at least one competitive characteristic comprises: a ranking/leader board; a measure of experience (e.g. total time having undertaken a competitive activity); a win-to-loss ratio; having an award, certification and/or accreditation; metrics regarding motor skills (e.g. reaction times, actions per minute and coordination); and/or a measure of knowledge and/or intelligence (e.g. an IQ). Preferably, at least one of the competitive characteristics is indicative of hardware and/or software. Optionally, the hardware and/or software is the means used by the first and/or second user/s so as to engage in a competitive activity. Optionally, the hardware and/or software is the means for providing a network connection for the first and/or second user/s. In particular, the competitive characteristics may be indicative of: computational processing; memory; network performance; presence (and if so, types of) or absence of peripheral computer input and/or output devices and/or the specifications of such input and/or output devices; and/or presence (and if so, types of) or absence of software for aiding or automating functions within a competitive activity.

Optionally, the at least one competitive characteristic is determined (or inferred) from: physical, network, transport and/or application layer type and/or values; payload data type, format and/or content (e.g. whether it is video, sound, voice, text, image, etc.); encryption protocol; a user-agent string; and/or source and/or destination of a network communication. Optionally, the competitive characteristics are retrieved from: user equipment associated with the first and/or second user/s; a server that is remote to the telecommunications network; and/or the telecommunications network. Optionally, a competitive characteristic is associated with a user account that is in turn associated with a user (i.e. the first and/or second user/s). Preferably, at least one of the competitive characteristics comprise a plurality of values, and wherein the network configuration is adapted in dependence upon a weighting and/or ranking of the plurality of values. Preferably, the method further comprises the step of identifying an activity in which the first and second users are, or are to be, engaged over the telecommunications network. Preferably, the extent to which the network performance is adapted is dependent upon the identified activity.

Preferably, at least one of the competitive characteristic is selected in dependence upon the identified activity. The competitive characteristic that is to be ascertained and/or compared may be selected in dependence upon the identified activity. Optionally, a plurality of competitive characteristics are selected, wherein said plurality of competitive characteristic are compared. Preferably, the method further comprises the step of identifying that the first and second users are both competing in a competitive activity over the telecommunications network, and performing said method having identified that the first and second users are both competing in the competitive activity. Preferably, when it is identified that the first and second users are competing against one another. Preferably, the method further comprises the step of reversing the adapting of the network configuration. Preferably, said reversing is performed when the first and second users are no longer competing.

In another aspect of the invention, there is provided a telecommunications network for facilitating interaction between a first user and a second user over the telecommunications network, comprising: a receiver for receiving a competitive characteristic associated with the first user and a competitive characteristic associated with the second user; a processor configured to: compare the received competitive characteristics and to identify whether there is a disparity between the competitive characteristics that exceeds a threshold, thereby to identify a competitive advantage associated with the first or second user; and a controller configured, in response to identifying a disparity that exceeds the threshold, to: adapt a network configuration of a network connection associated with the first user so as to offset the competitive advantage associated with the first or second user. Preferably, the processor and/or the controller is/are provided: in a core of the telecommunications network; an edge of the telecommunications network; and/or User Equipment (UE) associated with the first and/or second user/s.

In yet another aspect of the invention, a computer-readable storage medium comprising instructions that, when executed by a processor associated with a telecommunications network, causes the telecommunications network to perform the method as described above.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise. Furthermore, features implemented in hardware may generally be implemented in software, and vice versa. Any reference to software and hardware features herein should be construed accordingly.

The invention extends to a method of managing a telecommunications network and to a telecommunications network as described herein and/or substantially as illustrated with reference to the accompanying drawings. The present invention is now described, purely by way of example, with reference to the accompanying diagrammatic drawings, in which:

SPECIFIC DESCRIPTION

Figure 1:
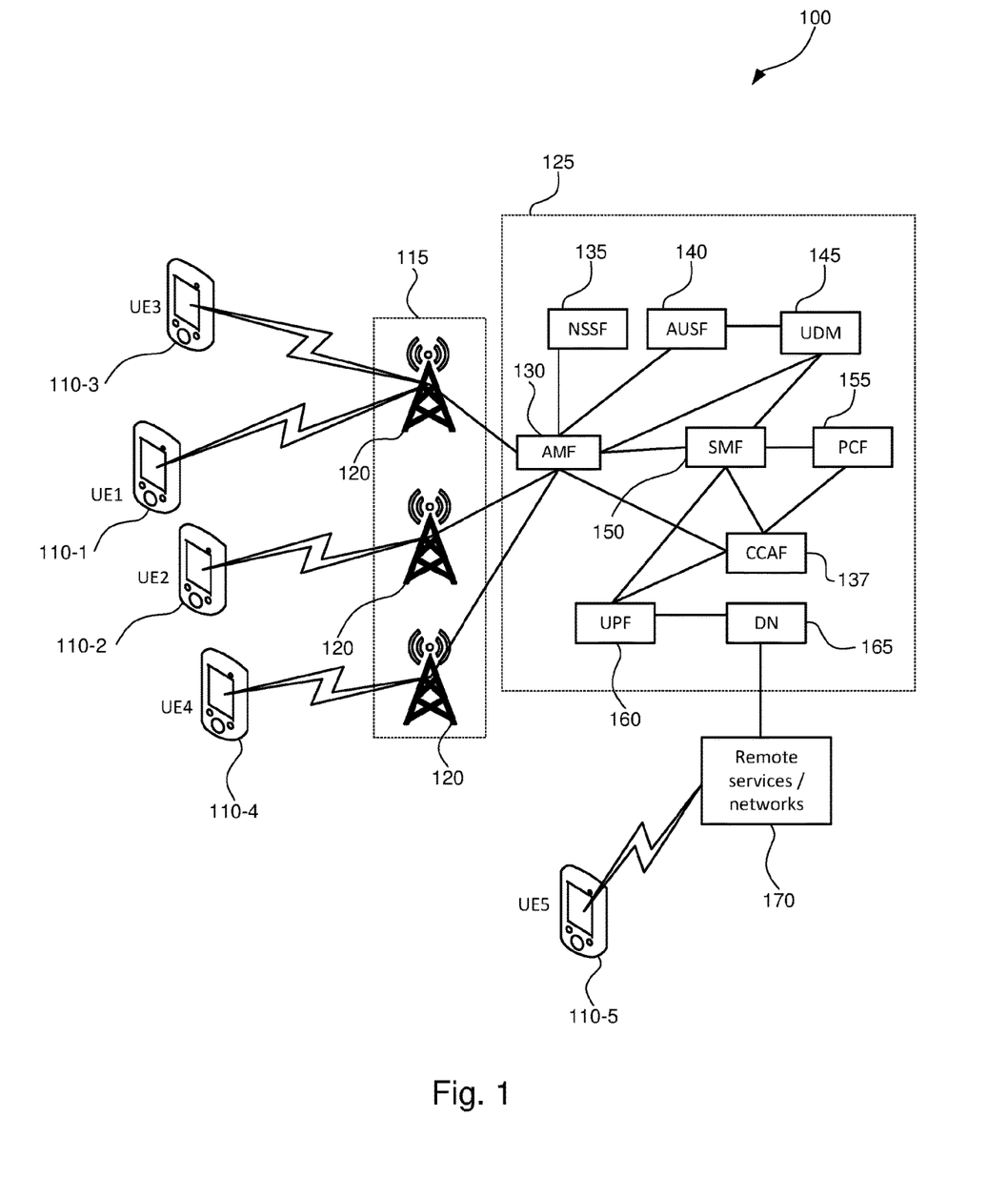
FIG. 1 shows a telecommunications network.

FIG. 1 shows an exemplary telecommunication network 100. The network 100 is a mobile cellular network comprising a plurality of User Equipment (UE) 110 (e.g. in the form of a mobile cellular device, laptop or tablet). Each UE 110 is configured to utilise the telecommunications network 100 by accessing a Radio Access Network (RAN) 115, as provided by a RAN access point 120 (e.g. in the form of a macro-, micro-, pico- or femto-cell site). In turn, the RAN access point 120 is connected to a core of the network 125.

The core network 125 is available to connect to remote networks and/or services 170, and not least to the Internet. As a result, the plurality of UEs 110-1 to 110-4 are also able to communicate with a UE 110-5 on a remote network 170.

The core network 125 in turn comprises the following functional components:
  Access and Mobility management Function (AMF) 130;
  Network Slice Selection Function (NSSF) 135;
  Competitive Characteristic Ascertaining Function (CCAF) 137;
  AUthentication Server Function (AUSF) 140;
  Unified Data Management (UDM) 145;
  Session Management Function (SMF) 150;
  Policy Control function (PCF) 155;
  User Plane Function (UPF) 160; and
  Data Network (DN) 165.

By means of the aforementioned functional components, the network 100 provides and manages a plurality of network slices. Network slicing provides a virtualised network comprising multiple logical networks—"network slices"—within a single physical network. This is typically undertaken to offer differentiated service models, which might include varying performance and/or stability characteristics within a network. The NSSF 135 is configured to identify and to select a suitable network slice for UEs.

In overview, the network 100 adapts its configuration in order to improve fairness for users competing over the network; this is achieved by affecting performance of the network 100 so as to offset a significant inequality in a competitive characteristic associated with UEs and/or their users when such UEs/their users are together partaking in an appropriate competitive activity over the network 100 and/or are relying upon the network to support a competitive activity.

The competitive characteristic is an indicator of a competitive advantage, and includes a measure of skill in a competitive activity and/or an indication of means used to partake in the competitive activity.

In turn, skill is a measure of a user's (actual or expected) competence/experience in a given competitive activity or aspect of a competitive activity.

Skill is associated with a user by means of a user account, and includes, for example:
  a ranking/position in a leader board;
  total time having undertaken a competitive activity (i.e. experience);
  a win-to-loss ratio;
  having an award, certification and/or accreditation;
  metrics regarding motor skills (e.g. reaction times, actions per minute and coordination); and/or
  a measure of knowledge and/or intelligence (e.g. an IQ).

The parameters that indicate skill may vary with different competitive activities. Accordingly, skill is measured in a way that is dependent on the competitive activity in which a user is, or will be, undertaking over the network.

Furthermore, for certain competitive activities, skill may be difficult to measure with any reliability or skill may be an insignificant determining factor in the outcome of a competitive activity (e.g. fewer factors attributable to skill may determine a user's ability to influence the outcome of an auction in their favour than in a racing game). Accordingly, the extent to which skill is used to offset unfairness is weighted on the reliability with which skill can be measured for a given competitive activity and/or on the ability of a given skill to influence the outcome of a competitive activity.

Means is a measure of the (actual or expected) competitive advantage to be gained, for a given competitive activity, as a result of hardware and/or software associated with a UE (and its network connection) that is being used to engage in a competitive over the network; this includes hardware and/or software of the: UE 110 itself; RAN 115; the core network 125; and of remote networks 170 accessed by the UE.

In particular, aspects of hardware that may influence a user's ability to compete in a competitive activity over a network include: processors (e.g. central and graphics); memory; network cards; transceivers; routers; repeaters; modems; and/or peripheral devices (e.g. keyboards, mouse, monitor, etc.). Similarly, aspects of software that may influence a user's ability to compete in a competitive activity over a network include: automation programs and software (e.g. bots, scripts and macros, such as for automatic bidding in an auction); operating system type and version; and/or type and version of drivers for hardware (e.g. graphical processing unit drivers).

The parameters that indicate means may vary with different competitive activities, and are therefore selected in dependence on the competitive activity being undertaken.

As used herein, a competitive characteristic associated with a UE 110 connotes a competitive characteristic associated, as appropriate, with: the UE 110 itself; its user; the network 100 as accessed by the UE 110; and/or a remote service/network 170 as accessed by the UE 110.

Figure 2:
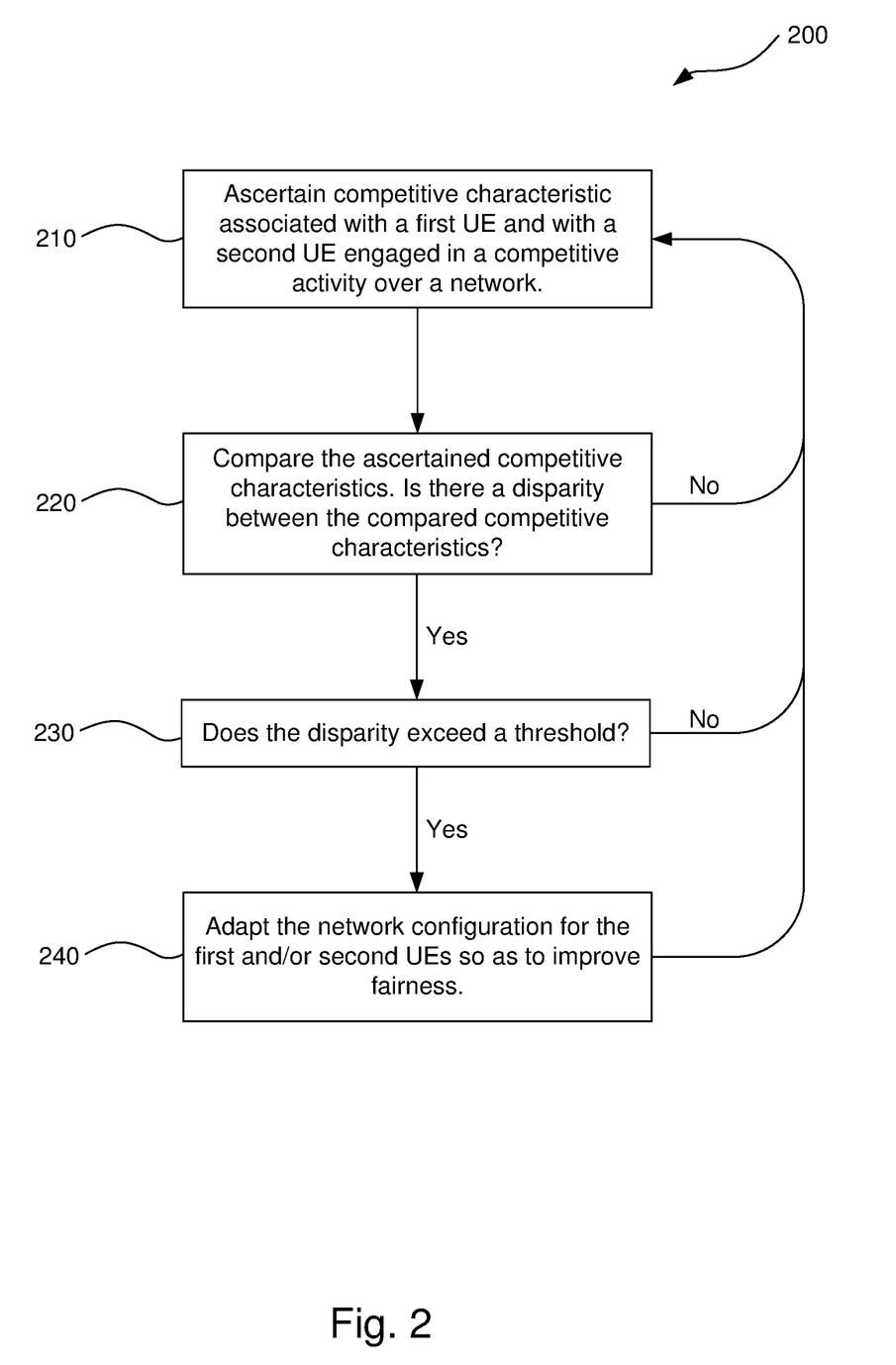
FIG. 2 shows a process for improving fairness for users of the network.

FIG. 2 outlines a process 200 for managing the network 100 so as to improve fairness for users engaged in a competitive activity over the network 100 by means of a first UE 110-1 and a second UE 110-2. In a first step 210, a competitive characteristic associated with the first 110-1 and second 110-2 UEs is ascertained by a UE and/or the core network 125, and specifically by the CCAF 137, by means of interfaces with, not least, the UPF 160 and/or a remote server storing data relating to competitive characteristics (such as via remote services/network 170).

In a next step 220, the ascertained competitive characteristics in respect of the first UE 110-1 is compared to that of the second UE 110-2 so as to assess whether there is a disparity (i.e. an inequality) in the competitive characteristics for each UE. If so, an evaluation is made as to whether or not the disparity is significant, for example by assessing whether the disparity exceeds a threshold 230.

If the disparity is significant, this may indicate that the first UE 110-1 or second UE 110-2 has a material competitive advantage that may affect the outcome of the competitive activity. As a result, in step 240, the network 100 is reconfigured so as to improve fairness for the first and second UEs. Reconfiguration of the network is performed to the detriment of network performance for either the first UE 110-1 or the second UE 110-2 and/or to the benefit of either the first UE 110-1 or the second UE 110-2, which in turn may affect performance in the competitive activity, and therefore help offset the identified competitive advantage(s).

Network performance is measured based on, not least: latency; bandwidth (downlink and/or uplink); Round-Trip Time (RTT) delay; and/or error rate.

For example, to improve fairness, the network configuration is adapted so as to affect network performance in such a way as to:
  lower network performance for the first UE 110-1 (i.e. handicapping the first UE), where it is determined that the first UE 110-1 has competitive characteristics that may provide a material competitive advantage over the second UE 110-2; and/or improve network performance for the second UE 110-2 (i.e. helping the second UE), where it is determined that the first UE 110-1 has competitive characteristics that may provide a material competitive advantage over the second UE 110-2.

Adapting the network configuration so as to offset the disparity in competitive characteristics is performed, for example, by:

changing the network or part thereof (e.g. a wireless wide area cellular network, a fixed-line network or wireless local area network) over which the first UE 110-1 and/or the second UE 110-2 engage with the competitive activity;
in particular, this includes changing the network slice with which the first UE 110-1 and/or the second UE 110-2 are associated.

changing the path of a network communication from and/or to a given UE 110, so as to make the network paths for a plurality of UEs different (beyond that inherently necessary), including, for example:
registering each UE with different Mobile Network Operators (MNOs) or Internet Service Providers (ISPs);
having each UE utilise different RAN access points 120; and
accessing resources from different network locations, such as the first UE 110-1 accessing resources from a server via the remote network 170, and the second UE 110-2 accessing the same resources from an edge of the network 100 (e.g. RAN access point 120), this includes first changing the location of said resource by, for example, moving the resource (in a networking sense):
closer to the second UE 110-2; and/or
further from the first UE 110-2.

increasing or decreasing the priority with which a network communication associated with a given UE is handled by the network;

reducing or inducing delays in the handling of a network communication associated with a given UE (thereby to change latency and/or jitter), for example by buffering such network communications;

increasing or decreasing bandwidth and/or transfer speeds for a given UE (i.e. throttling); and/or inducing errors in the handling of network communications (e.g. corrupting data packets) associated with a given UE (thereby to increase error rate).

Any combination of the above-listed methods is used to improve or reduce network performance for a given UE, thereby to help offset a competitive advantage associated with a UE in an effort to improve fairness.

The network configuration for a given UE, and in particular the configuration of a network slice with which a UE is—or is to be—associated, is adapted by the network core 125 and/or remote networks 170. In particular, the network configuration is adapted by the AMF 130, SMF 150 and/or the UPF 160, as appropriate.

Once the network configuration has been adapted as per step 240, the process 200 then reiterates by reverting to the first step 210. Likewise, if at step 220 there is no disparity, or if at step 230 the disparity is insignificant (in that it does not exceed the threshold), then the process also reiterates by reverting to the first step 210.

Figure 3:
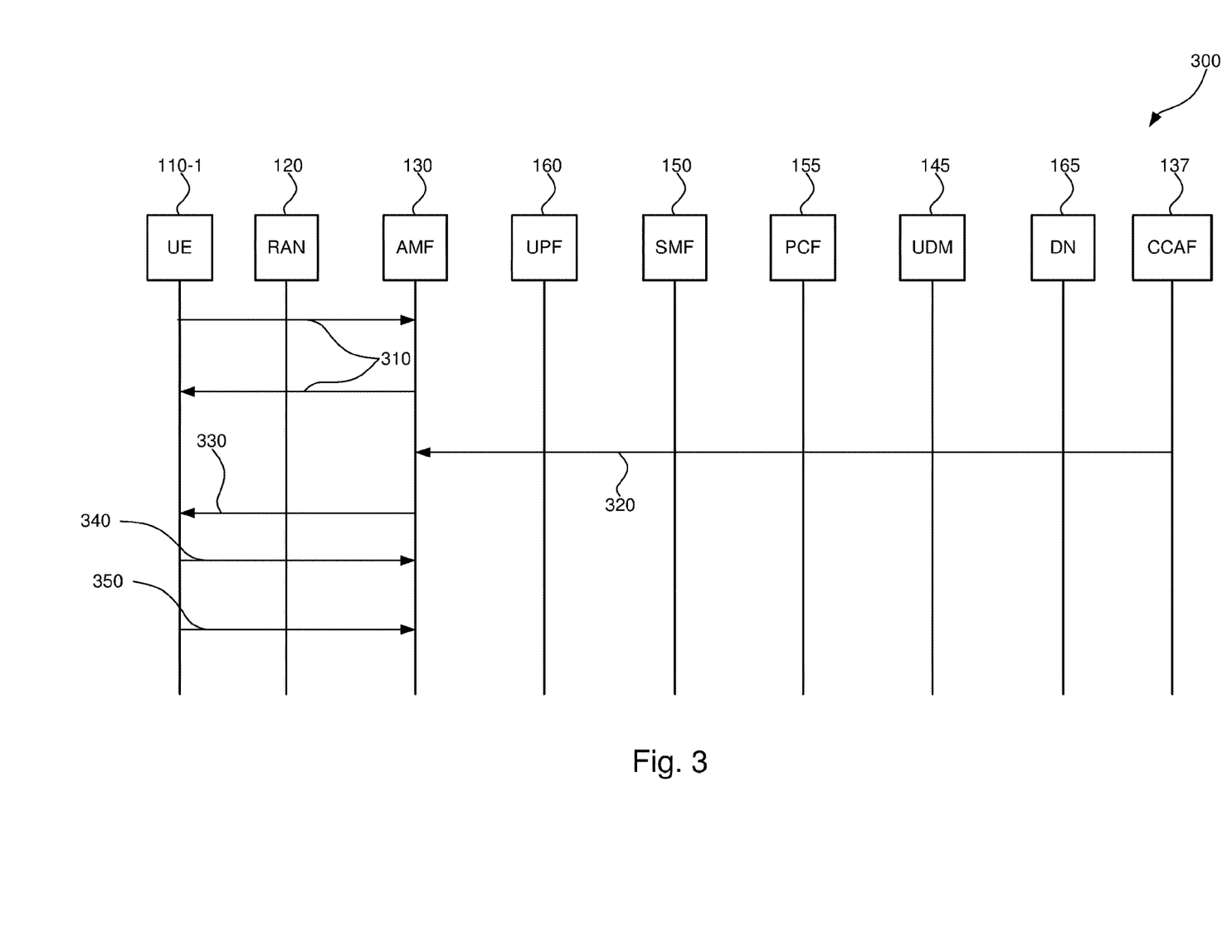
FIG. 3 is a signalling diagram showing the signalling between user equipment and the network.

FIG. 3 shows, in more detail, a process 300 for improving fairness for a given UE (in particular the signalling across the network 100) by reallocating the UE onto a different network slice so as to improve fairness.

In this example, the first 110-1 and second 110-2 UEs are competing against one another in a competitive activity over the network 100.

In a first step 310, the first UE 110-1 and the core network 125 (and in particular the AMF 130) engage in signalling, via the RAN 120, so as to establish a connection. The first UE 110-1 is allocated, by means of the NSSF 135, to a first network slice. A Protocol Data Unit (PDU) session is thereby established, and this is achieved, for example, as outlined in the 3rd Generation Partnership Project (3GPP) Technical Specification 23.502, version 15.2.0, section 4.3.2.2, the contents of which are hereby incorporated by reference.

In a next step 320, the CCAF 137 ascertains (via an interface, at least, with the UPF 160 and/or a remote server 170) the competitive characteristic in respect of the first UE 110-1 and reports the ascertained competitive characteristic to the AMF 130.

In a corresponding manner, steps 310 and 320 are repeated for the second UE 110-2 (not shown in FIG. 3), so as to connect the second UE 110-2 to the network 100 (or another network) and to ascertain the competitive characteristic associated with the second UE 110-2.

In accordance with the process described with reference to, and as shown in, FIG. 2, the CCAF 137 compares the ascertained competitive characteristics of the first 110-1 and second UEs 110-2 so as to identify any significant disparities in competitive characteristics. In this example, the competitive characteristic associated with the second UE 110-2 is ascertained to be significantly better than the competitive characteristic associated with the first UE 110-1.

In view of the ascertained disparity in competitive characteristics, it is sought to offset the imbalance in competitive characteristics amongst the UEs by improving the network performance in respect of the first UE 110-1. Accordingly, the NSSF identifies a network slice—a second network slice—that will help achieve this result; to do so, the AMF 130 requests Network Slice Selection Assistance Information (NSSAI) from the NSSF 137 based on a desired specification for the second network slice, as provided by the AMF 130. Accordingly, the AMF 130 instructs 330 the first UE to detach from the first network slice and instead to attach to the second network slice, as identified by the NSSF. The first UE 110-1 subsequently requests attachment to the second network slice 340 and, once said request has been accepted, a Protocol Data Unit (PDU) session with the second network slice 350 is established, for example as outlined in the 3rd Generation Partnership Project (3GPP) Technical Specification 23.502, version 15.2.0, section 4.3.2.2.

As ascertained by the NSSF, the second network slice offers improved network performance over the first network slice onto which the first UE was originally allocated, and a network performance that exceeds the network performance experienced by the second UE. In this way, the first UE 110-1 gains a competitive advantage over its default network configuration.

Certain networks allow UEs to engage in activities that do not involve competition amongst various UEs. As a result, it may not be appropriate to attempt to improve fairness as outlined herein for all activities, nor for all UEs.

In such circumstances, the network 100 is configured to distinguish between activities where it is appropriate to improve fairness ("competitive activities") and activities where it is not possible and/or not appropriate to improve fairness ("non-competitive activities"). Accordingly, the network 100 will only improve fairness for such competitive activities. Examples of competitive activities include: multiplayer peer-to-peer games; financial trading; auctions; voting; and data communication that supports a competitive activity and/or "real life" competition (e.g. professional sporting events, such as motor racing).

A non-competitive activity is an activity: with no inherent competition; relating solely to the communication of information that has no ability to affect the outcome of a competitive activity and/or "real life" competition; serving only a single UE; and/or where the outcome is driven solely by chance. Examples of non-competitive activities therefore typically include: on-demand streaming of media; and games purely of chance.

In order to differentiate between competitive and non-competitive activities, the network 100 identifies (or infers) the activity (explicitly or simply whether or not it is a competitive activity) by inspecting network communications traversing the network 100, for example by assessing the:

physical, network, transport and/or application layer type and/or values;
payload data type, format and/or content (e.g. whether it is video, sound, voice, text, image, etc.);
encryption protocol;
source and/or destination of a network communication;
identity of a remote service or network 170 being accessed;
whether the traffic has been allocated to an activity-specific network slice (such as a low-latency gaming network slice); and/or
type of UE receiving or sending the network communication (e.g. hardware type and/or operating software version).

Identification of the activity is performed by the core network 125 (in particular by means of the UPF 160, which then reports the identified activities to the AMF 130 and/or CCAF 137) and/or by the UE(s) that is(/are) engaged in the activity. In addition, or alternatively, the activity is communicated to the network by a UE and/or by a remote network 170 that facilitates the activity. Accordingly, there is provided an interface for informing the AMF 130 and/or the CCAF 137 that traffic associated with a particular session and/or competitive activity is to be monitored so as to identify the competitive activity.

It will be appreciated that where a network restricts access only to competitive activities (such as a private network—or network slice—dedicated solely to financial trading) it is not necessary to differentiate between competitive and non-competitive activities as outlined above.

In certain networks, the network 100 is configured to differentiate between competing and non-competing UEs, where competing UEs are together engaged in the same competitive activity (whether or not against one another). Non-competing UEs are UEs that are not engaged in an activity—whether or not a competitive activity—together. Competing UEs may be competing at the same time or at different times.

The processes described herein are performed when there are at least two competing UEs.

As a result, in order to improve fairness amongst competing UEs, the network 100 is configured to identify sets of competing UEs, for example by using similar methods to that for identifying a competitive activity (as described above), as performed by the core network 125, by a remote network 170 and/or by UEs, which may be assisted by network servers (or nodes) facilitating the competitive activity, and preferably without the effects of the changes to network configuration being directly noticeable by users.

In one example, a competitive characteristic is directly retrieved from memory. Alternatively, or additionally, a competitive characteristic is estimated or inferred, for example from: dynamic analysis of performance during a competitive activity; a network address (e.g. a MAC code indicative of hardware type); and/or a network configuration (e.g. network slice onto which a UE is allocated).

The extent to which a network configuration is adapted so as to improve fairness amongst competing UEs is dependent, at least, on the extent of the disparity in competitive characteristics. In particular, the network 100 aims to offset significant disparity in the competitive characteristic, but without causing significant detriment to the practicability and/or mutual enjoyment of the competitive activity.

When reducing network performance for a given UE, the extent to which the configuration of the network is adapted is limited, not least so as to maintain acceptable network performance and to honour Service Level Agreements. This is appropriate, for example, in relation to increasing latency when users are competing in a fast-paced action game. Accordingly, the network 100 is prohibited (according to predefined rules accessible to the core network 125) from adapting a network configuration to an extent that causes network performance to change beyond threshold values, and the network configuration is therefore available only to be varied within a range of values.

In one example, the threshold values are absolute (e.g. a fixed value of network performance, such as a change in latency of no more than 100 ms) and/or relative (e.g. a proportion of users' network performance, such as a change of no more than 50% of a given UE's latency).

In order to reduce computational processing, the frequency with which the network 100 is adapted is limited.

In one example, reducing network performance is selected as a least preferred—last resort—option. Instead, the network first assesses whether it is possible to improve the network performance for the UE(s) having worse (or the worst) competitive characteristic(s) amongst a group of competing UEs so as to help offset a competitive advantage of the UE(s) having a better (or the best) competitive characteristic(s); if this improvement is insufficient to offset the competitive advantage, only then is the network performance in respect of the UE(s) with the better (or the best) competitive characteristic(s) reconfigured in such a way as to reduce their network performance.

Figure 4:
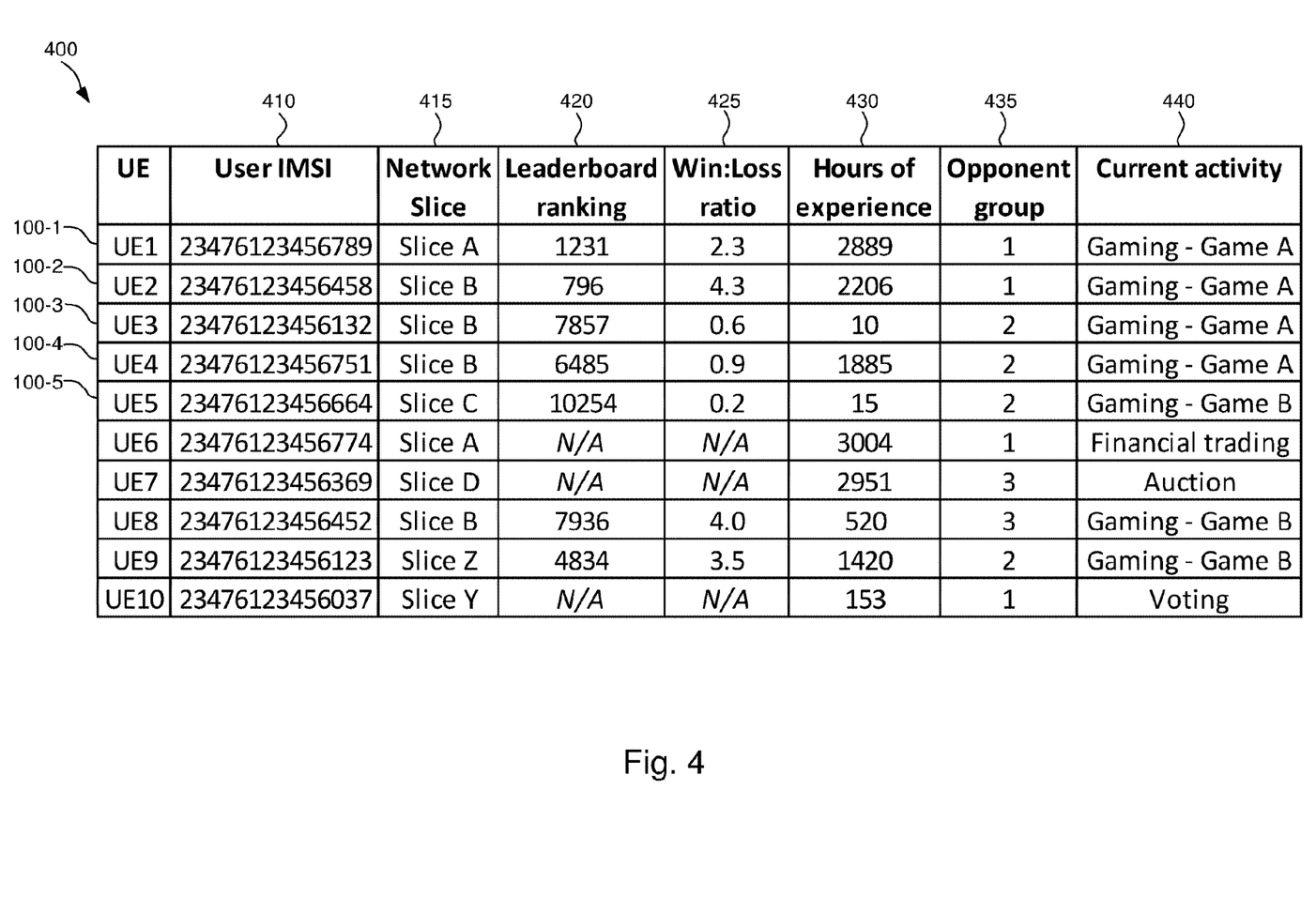
FIG. 4 show a table storing competitive characteristics associated with various users and used to improve fairness.

FIG. 4 shows an exemplary table 400 storing competitive characteristics for various UEs 110.

Table 400 comprises a plurality of fields for each UE, including, for example, fields for:

a unique UE and/or user identifier, for example an International Mobile Subscriber Identity (IMSI) number 410 and/or a user account (not shown);
network characteristics, including the network slice onto which a user is currently allocated 415;
competitive characteristics for a given competitive activity, in the form of metrics relating to skill:
a leader board ranking 420;
a ratio of wins to losses 425;
hours of experience engaged in a particular competitive activity 430;

team or institution (or "opponent group") 440, for a current competitive activity 440, to which a given UE is allocated; and an identifier for a competitive activity that a given UE is currently (or will be) engaged 445, for example a multiplayer peer-to-peer game, an auction, financial trading and voting.

Table 400 therefore identifies individual UEs and associates to them competitive characteristics so as to assess when it is appropriate—and then how—to adapt a network configurations so as to improve fairness.

For example, the first 110-1 and second 110-2 UEs are engaged in the same multiplayer peer-to-peer game ("Game A"), and are assigned to the same opponent group (group "1"). The third 110-3 and fourth 110-4 UEs are also engaged in "Game A", but are together assigned to a different, and competing, opponent group (group "2") to the first 110-1 and second 110-2 UEs.

The network core 125 identifies from table 400 a significant disparity in the competitive characteristics amongst the participating UEs of "Game A", as evidenced not least by the superior competitive characteristics of opponent group "1"—supported by the higher rankings, win-to-loss ratio and hours of experience—to that of opponent group "2".

Accordingly, in order to help improve fairness, a network reconfiguration is performed so as to handicap opponent group "1" and/or advantage opponent group "2", and the network reconfiguration is applied to any selection of competing UEs, such as: the first 110-1 and/or second 110-2 UE; and/or to the third 110-3 and/or fourth 110-4 UE.

For example, the reconfiguration is applied so as to effect a minimum change on individual competing UE's network performance and/or so as to affect the fewest number of competing UEs.

In one example, a plurality of competitive characteristics, such as leader board ranking 420 and win-to-loss ratio 425 are used to assess fairness. In particular, a formula is used to derive a single metric (not shown in FIG. 4) from the plurality of competitive characteristics. Such a formula includes weightings of the plurality of competitive characteristics so as give due weight to the expected competitive effect afforded by a given competitive characteristic.

As shown in FIG. 4, the competitive characteristic is specific to a current activity 440. Furthermore, not all of the listed competitive characteristics are applicable to a given current activity. For example, a leader board ranking 420 and a win-to-loss ratio 425 are not appropriate for financial trading or voting (but, for example, latency and/or jitter may be). Additionally, or alternatively, a competitive characteristic is available to be independent of the current activity, in particular where it relates to means (albeit not shown in FIG. 4), rather than skill.

Figure 5:
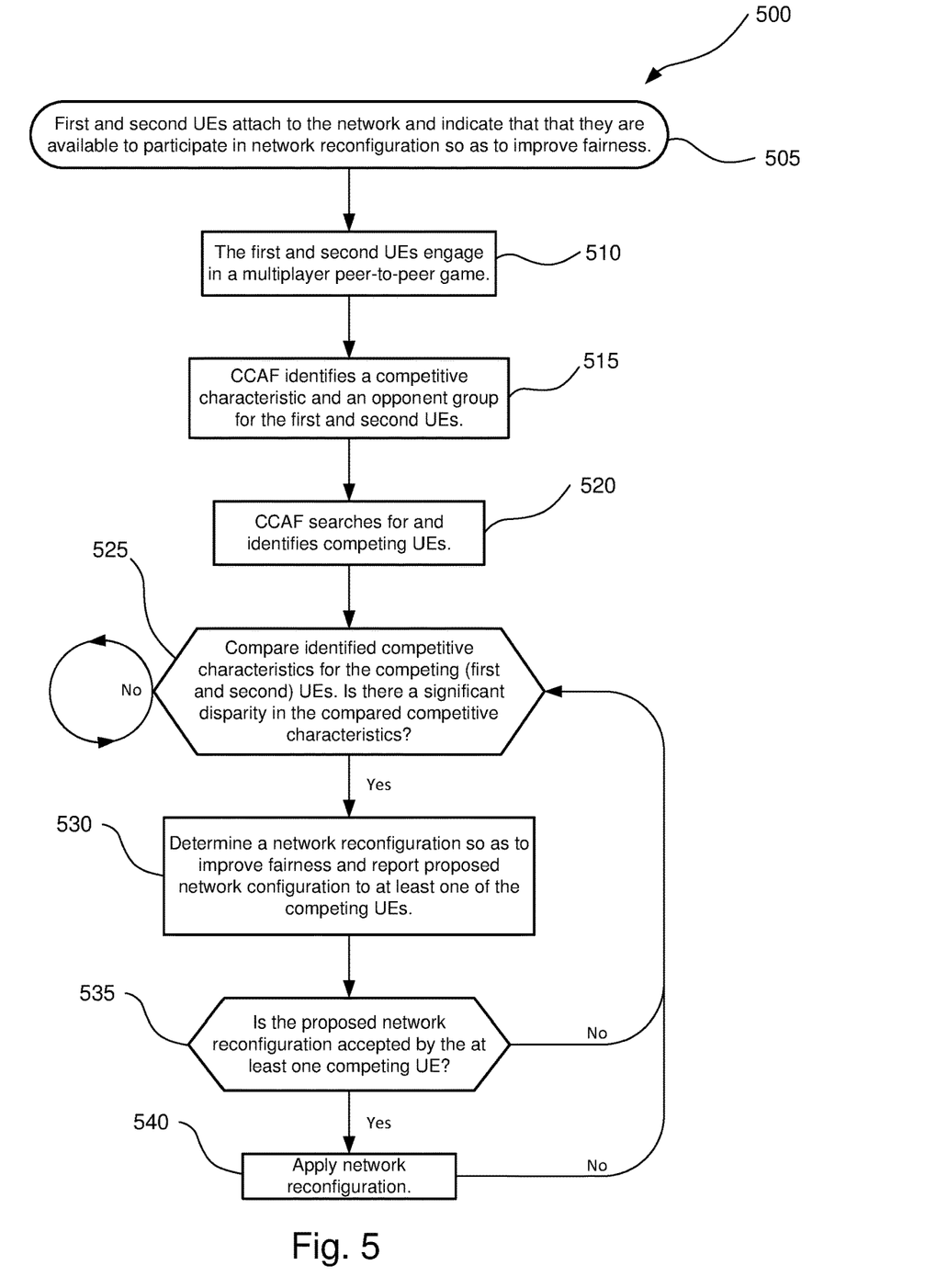
FIG. 5 shows, in more detail, a process for improving fairness for users of the network.

In a further example, FIG. 5 shows a process 500 for improving fairness for UEs 110 competing in a peer-to-peer game over the network 100.

In a first step 505, the first 110-1 and second UEs 110-2 attach to the network 100, and the network identifies that the UEs are eligible to participate in network reconfiguration so as to improve fairness; this is, for example, identified by way of a flag that is communicated to the network when the UEs attach to the network. The absence of such a flag (for one, some or all UEs) would preclude network reconfiguration so as to effect a UE's network performance in order to improve fairness.

In a next step 510, the first 110-1 and second UEs 110-2 engage in a multiplayer peer-to-peer game; this is reported to, or identified by, the network core 125 (including the CCAF 137) as described above.

Accordingly, the CCAF 137 then determines the competitive characteristic of the first UE, not least in dependence on the current activity in which the first UE is engaged 515, as identified in step 510. At the same time, and in a similar manner, the CCAF 137 (by way of an interface with, not least, the UPF 160) identifies opponent groups to which the first and second UEs are allocated for the games in which they are engaged.

Based on the information retrieved by the CCAF 137, the CCAF performs a search to identify competing UEs for a given UE, such as for the first and second UEs 520. In this example, the CCAF 137 identifies that only the first and the second UEs are engaged in the same game, and have been allocated to different opponent groups; they are, therefore, competing head-to-head.

At step 525, the CCAF 137 compares the competitive characteristics for competing UEs; that is, in this example, for the first 110-1 and second 110-2 UEs. If no significant discrepancy exists between the compared competitive characteristics, then step 525 reiterates since competitive characteristics may be time-dynamic and/or the competing UEs may change (e.g. the second UE may drop out and be replaced by the third UE 110-3).

However, if at step 525 it is determined that there is a significant discrepancy between the compared competitive characteristics, an appropriate network reconfiguration is determined so as to offset the discrepancy 530. The type and extent of reconfiguration is determined in dependence on, not least, the extent of discrepancy and in accordance with rules regarding the allowable reconfiguration.

For transparency, the network reconfiguration that is determined at step 530 is proposed to at least one of the competing UEs, and for example to:

at least one of the competing UE(s) that will be:
handicapped;
advantaged; and/or
unaffected;
all of the competing UEs;
a random selection of competing UEs;
a UE hosting the competitive activity; or
an administrating/refereeing UE.

The at least one competing UE to whom the network reconfiguration is proposed may then respond to the proposal, and their response is processed at step 535. If the at least one UE accepts the proposal, then the network reconfiguration is applied 540 and the process reiterates back to step 525. If, the proposal in not accepted, then the network reconfiguration is not applied and the process reiterates back to step 525. If, however, no response is provided by the at least one UE, then, if available, the proposal is instead forwarded to an alternative UE or selection of UEs or a default action is taken, such as applying the network reconfiguration 540 or not applying the network reconfiguration.

Once a UE has ceased partaking in a competitive activity, any network reconfiguration that was applied so as to improve fairness during the duration of a competitive activity and that affects the UE, is reversed. If the competitive activity is ongoing, then a reassessment of the balance of competitive characteristics of the remaining competing UEs is performed, which may lead to altering the network configuration (for example, where this leads to an imbalance in team size across competing teams).

Alternatives and Modifications

In the aforementioned, the telecommunications network 100 is generally shown and described as a cellular wide area network in accordance with 5G technology. However, in one alternative the telecommunications network 100 is any kind of telecommunications network, including a wired network, a local area network, or combination of network types.

In FIG. 1, the UEs 110 are shown as accessing the same core network. However, it will be appreciated that the UEs can access different core networks (and be connected to one another via the remote network 170).

In one example, competitive characteristics are compared for each individual competing UE, a selection of competing UEs or across teams of UEs (for example by aggregating the competitive characteristics for the members of each team, including calculating an arithmetic mean or a grand total competitive characteristic per team).

In yet another alternative, the aforementioned processes of improving fairness are performed when competing UEs 110 are used to support a competitive activity (rather than the UEs directly participating in the competitive activity). In one example, the UEs are associated with a competitor that is participating in a sport, and the UEs are used to communicate—over the network—with other competitors, a wider team and/or a referee. In a specific example, the UE is a voice, text or data (including telematics) communication device, and by the aforementioned process, fairness may be improved by, for example, delaying receipt of new information pertinent to the outcome of the sport (e.g. changes to rules, conditions, race routes, participants, etc.) for a competitor having a significant competitive advantage over another competitor.

In another alternative, the CCAF 137 resides at the edge of the network, and for example at the RAN access point (e.g. at an eNodeB or gNodeB).

In another alternative, the network 100 is also configured to adapt network performance so as to improve fairness in dependence on the network performance of a network connection associated with a given UE 110, for example as outlined in co-pending European Patent Application No. 19151635.0 (Applicant's reference A33737), the contents of which are herein incorporated by reference.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of managing a telecommunications network, the telecommunications network having a first user and a second user, the method comprising:
   ascertaining a competitive characteristic associated with the first user and a competitive characteristic associated with the second user, wherein each competitive characteristic comprises an indication of a level of skill of the associated user;
   comparing the ascertained levels of skill for the first and second users;
   identifying whether there is a disparity between the levels of skill that exceeds a threshold, thereby to identify a competitive advantage associated with the first or second user; and
   in response to identifying that the disparity between the levels of skill exceeds the threshold, adapting a network configuration of a network connection associated with the first user so as to increase a difference in network performance between the first user and the second user thereby to help offset the competitive advantage due to said disparity.

2. The method according to claim 1, wherein adapting the network configuration comprises reducing network performance of the network connection associated with the first user.

3. The method according to claim 1, wherein adapting the network configuration comprises improving network performance of the network connection associated with the first user.

4. The method according to claim 1, wherein adapting the network configuration comprises changing a path through the telecommunications network of a network communication from and/or to the first user.

5. The method according to claim 1, wherein adapting the network configuration comprises changing a location within the telecommunications network of a network resource that is to be accessed by the first user.

6. The method according to claim 1, wherein adapting the network configuration comprises corrupting a network communication from and/or to the first user.

7. The method according to claim 1, wherein adapting the network configuration comprises allocating the first user to a network slice.

8. The method according to claim 1, further comprising determining an extent of the disparity, and adapting the network configuration in dependence upon the determined extent of disparity.

9. The method according to claim 1, further comprising limiting the extent to which the network configuration is adapted.

10. The method according to claim 1, wherein at least one of the competitive characteristics further comprises an indication of hardware and/or software of the associated user, wherein the competitive advantage is further identified in dependence upon the said hardware and/or software.

11. The method according to claim 10, wherein the at least one of the competitive characteristics which further comprises the indication of hardware and/or software comprises an indication of: computational processing, memory and/or network performance.

12. The method according to claim 10, wherein the at least one of the competitive characteristics which further comprises the indication of hardware and/or software comprises an indication of presence or absence of peripheral computer input and/or output devices.

13. The method according to claim 10, wherein the at least one of the competitive characteristics which further comprises the indication of hardware and/or software comprises an indication of presence or absence of software for aiding or automating functions within a competitive activity.

14. The method according to claim 1, wherein at least one of the competitive characteristics further comprises a plurality of values, and wherein the network configuration is adapted in dependence upon a weighting and/or ranking of the plurality of values.

15. The method according to claim 1, further comprising identifying an activity in which the first and second users are, or are to be, engaged over the telecommunications network.

16. The method according to claim 15, wherein the extent to which the network performance is adapted is dependent upon the identified activity.

17. The method according to claim 15, wherein a composition of further parameters for at least one of the competitive characteristics is selected in dependence upon the identified activity, and wherein the competitive advantage is further identified using said composition.

18. The method according to claim 1, further comprising identifying that the first and second users are both competing in a competitive activity over the telecommunications network, and performing said method having identified that the first and second users are both competing in the competitive activity.

19. The method according to claim 1, further comprising reversing the adapting of the network configuration.

20. A non-transitory computer-readable storage medium comprising instructions that, when executed by a processor associated with a telecommunications network, causes the telecommunications network to perform the method according to claim 1.

21. The method according to claim 1, wherein the level of skill corresponds to (i) a ranking in a leader board, (ii) a win-to-loss ratio, and/or (iii) an award, certification and/or accreditation.

22. The method according to claim 1, wherein the level of skill corresponds to a total time undertaken in a competitive activity in which at least the first user and the second user compete.

23. The method according to claim 1, wherein the level of skill corresponds to (i) metrics regarding user motor skills and/or (ii) a measure of user knowledge and/or intelligence.

24. A telecommunications network for facilitating interaction between a first user and a second user over the telecommunications network, comprising:
a receiver for receiving a competitive characteristic associated with the first user and a competitive characteristic associated with the second user, wherein each competitive characteristic comprises an indication of a level of skill of the associated user;
a processor configured to:
compare the received levels of skill and to identify whether there is a disparity between said levels of skill that exceeds a threshold, thereby to identify a competitive advantage associated with the first or second user; and
a controller configured, in response to identifying a disparity between the levels of skill that exceeds the threshold, to:
adapt a network configuration of a network connection associated with the first user so as to increase a difference in network performance between the first user and the second user thereby to help offset the competitive advantage due to the disparity.

25. The telecommunications network according to claim 24, wherein the processor and/or the controller is/are provided: in a core of the telecommunications network; an edge of the telecommunications network; and/or User Equipment (UE) associated with the first user and/or the second user.

26. The telecommunications network according to claim 24, wherein the level of skill corresponds to (i) a ranking in a leader board, (ii) a win-to-loss ratio, and/or (iii) an award, certification and/or accreditation.

27. The telecommunications network according to claim 24, wherein the level of skill corresponds to a total time undertaken in a competitive activity in which at least the first user and the second user compete.

28. The telecommunications network according to claim 24, wherein the level of skill corresponds to (i) metrics regarding user motor skills and/or (ii) a measure of user knowledge and/or intelligence.

29. The telecommunications network according to claim 24, wherein at least one of the competitive characteristics further comprises an indication of hardware and/or software of the associated user, wherein the competitive advantage is further identified in dependence upon the hardware and/or software.

30. The telecommunications network according to claim 29, wherein the at least one of the competitive characteristics which further comprises the indication of hardware and/or software comprises an indication of: computational processing, memory and/or network performance.

31. The telecommunications network according to claim 29, wherein the at least one of the competitive characteristics which further comprises the indication of hardware and/or software comprises an indication of presence or absence of peripheral computer input and/or output devices.

32. The telecommunications network according to claim 29, wherein the at least one of the competitive characteristics which further comprises the indication of hardware and/or software comprises an indication of presence or absence of software for aiding or automating functions within a competitive activity.

* * * * *